Oct. 6, 1970      J. G. FENWICK      3,532,370
INTERLOCKING JOINTS FOR STRUCTURAL FRAMING MEMBERS
Filed June 7, 1968
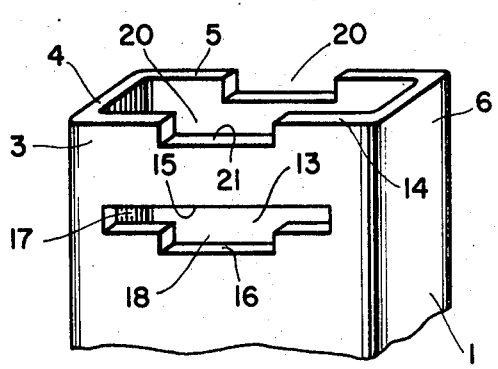
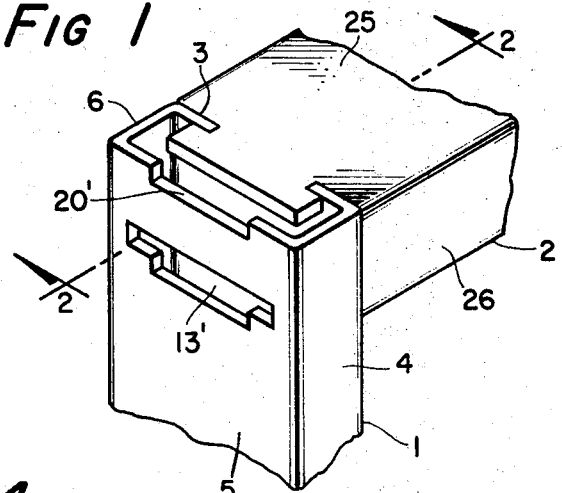
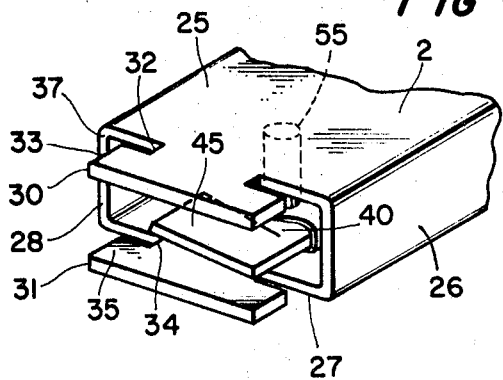
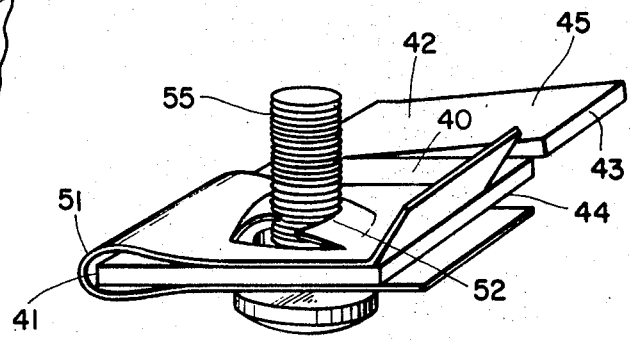
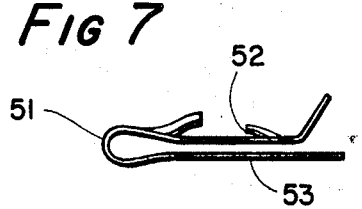
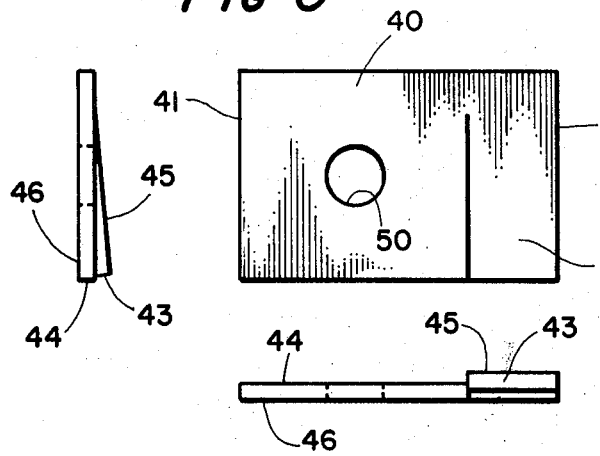
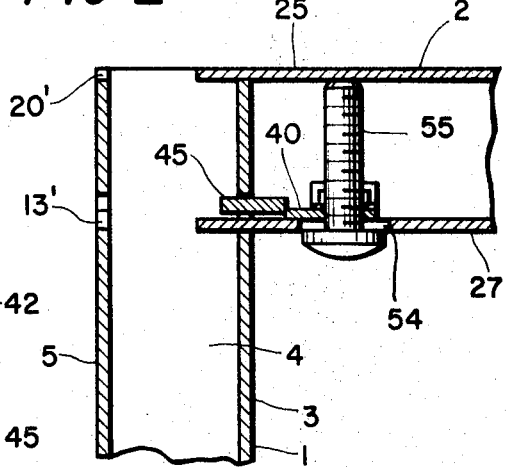
INVENTOR.
JAY G. FENWICK
BY
Wayne B. Easton
Attorney

United States Patent Office 3,532,370
Patented Oct. 6, 1970

1

3,532,370
INTERLOCKING JOINTS FOR STRUCTURAL
FRAMING MEMBERS
Jay G. Fenwick, Albert Lea, Minn., assignor, by mesne
assignments, to Streater Industries, Inc., Albert Lea,
Minn., a corporation of Minnesota
Filed June 7, 1968, Ser. No. 735,340
Int. Cl. F16b 7/00
U.S. Cl. 287—56                                    7 Claims

ABSTRACT OF THE DISCLOSURE

The invention relates to right angle joints for elongated structural members of the kind used for knock-down type frame structures. The ends of the structural members have male and female portions adapted to fit together and special locking means is provided for maintaining the members in locked engagement which is operable with a screwdriver to lock and unlock the joints.

BACKGROUND OF THE INVENTION

This invention relates to interlocking structural members of the type used for knock-down type frame structures and particularly to the forming and adapting of the end portions of such members to fit together to form a rigid joint. In addition, the invention is concerned with the providing of locking means associated with one of the members for locking and unlocking the joint which is operable with a screwdriver.

The prior art contains a number of joints of the general type presented herein which are similar in some respects to the joint of the present invention but this must necessarily be so because of the basic simplicity inherent in this subject matter.

SUMMARY OF THE INVENTION

In the joint of the present invention the ends of the structural members to be joined have male and female portions adapted to fit together and special locking means is provided for maintaining the members in locked engagement which is operable with a screwdriver to lock and unlock the joint.

A main object of the invention is to provide structural framing members having new and improved complementary end portions adapted to form rigid joints and new and improved locking means associated with one of the end portions for locking and unlocking the joint.

Another object of the invention is to provide new and improved structural framing members adapted to be easily and quickly joined together to form a rugged and rigid structure, by a person having no mechanical skill, with only the use of a screwdriver.

Another object of the invention is to provide new and improved knock-down type structural framing members which joint together to form rigid and rugged structures and which are inexpensive to manufacture.

Another object of the invention is to provide a new and improved joint for structural framing members which includes novel locking means for the joint which is simple in construction, inexpensive to manufacture, reliable in operation and is operable with a screwdriver.

2

Other objects of the invention will become apparent from the following specification, the drawings and the appended claims.

DESCRIPTION OF THE DRAWINGS

FIG. 1 is a fragmentary perspective view of an interlocking right angle joint for two structural members embodying the invention;

FIG. 2 is a fragmentary elevational sectional view taken on the plane 2—2 indicated in FIG. 1 and shows locking means associated with the two structural members;

FIG. 3 is an enlarged perspective view of the upper end portion of the vertically extending structural member of FIGS. 1 and 2;

FIG. 4 is an enlarged perspective view of the left end portion of the horizontally extending structural member of FIGS. 1 and 2 and shows the locking means associated with this member;

FIG. 5 is an enlarged perspective view of the locking means shown in FIGS. 2 and 4;

FIG. 6 shows a plan view and front and side elevational views of the wedge member of the locking means shown in FIG. 5; and FIG. 7 is a side elevational view of the fastener member of the locking means shown in FIG. 5.

DESCRIPTION OF THE PREFERRED EMBODIMENT

In the perspective view of FIG. 1 there is shown the upper end portion of an elongated, vertically extending structural member 1 and the left end portion of an elongated, horizontally extending structural member 2. Structural members 1 and 2 fit together to form a right angle joint to which the invention is directed.

Structural member 1 is illustrated as having a box or rectangularly shaped tubular section with four walls 3, 4, 5 and 6. Only wall 3 is of interest or significance in describing the invention and, as it has an opening therethrough which will be described in detail, the wall 3 may be referred to as a slab to connote a thickness through which an opening can extend.

Referring to FIGS. 1, 2 and 3, the upper end of structural member 1 is formed with a transversely extending opening 13 in spaced relation to the top edge 14 of structural member 1. Opening 13 has upper and lower edges 15 and 16 and comprises an upper, rectangularly shaped ingress section 17 and a lower rectangularly shaped mortise section 18. Mortise section 18 is symmetrically arranged relative to the ingress section 17 and is shorter in length than the ingress section.

The top edge 14 of wall 3 has a recess or mortise section 20 of the same size as and in vertical spaced alignment with the mortise section 18 of opening 13. Mortise section 20 has a horizontally extending, lower edge 21 which corresponds to the lower edge 16 of mortise section 18.

Wall 5 of structural member 1, which is opposite wall 3, is illustrated as being provided with opening and recess configurations, such as the opening 13′ and the recess 20′, which are illustrated as being identical in shape and having the same relative positions as opening 13 and recess 20, but this is not essential within the scope of the invention.

Referring to FIGS. 2 and 4, structural member 2 is illustrated as having a box or rectangularly shaped tubular section with four walls 25, 26, 27 and 28. Opposing walls 25 and 27 have identically shaped tenons 30 and 31 extending respectively therefrom which in a sense are longitudinal extensions of these walls and lie in the same planes thereof.

Tenon 30 has a neck portion 32 and a shoulder portion 33 and tenon 31 has a neck portion 34 and a shoulder portion 35. Referring to the relationship of tenon 31 to the opening 13 of structural member 1, the length of the tenon shoulder portion 35 is slightly less than the width of ingress section 17, the thickness of the tenon is slightly less than the height of ingress section 17 and about equal to the height of mortise section 18, the width of the tenon neck portion 34 is slightly less than the width of mortise section 18, and the length of neck portion 34 is slightly greater than the thickness of the wall slab 3.

Referring to the relationship of the tenon 30 to the recess or mortise section 20 of structural member 1, the thickness of the tenon 30 is about equal to the height of the mortise section 20, the width of the tenon neck portion 32 is slightly less than the width of mortise section 20, and the length of neck portion 32 is slightly larger than the thickness of the wall slab 3.

In joining structural members 1 and 2 together, member 2 is caused to approach member 1 at a level so that tenon 31 can be slipped through ingress section 17 a sufficient distance so that the end 37 of member 2 from which the tenons 30 and 31 extend moves into abutting engagement with the wall 3 of member 1. At this stage the tenon 30 is above the mortise section 20 and the tenon 31 is above the mortise section 18. If the member 2 is now moved downwardly relative to member 1, the tenon neck 32 will drop into the mortise section 20 and the tenon neck 34 will drop into the mortise section 18. With the construction described thus far the tenon shoulders 33 and 35 are engageable with the inside of wall 3 at points adjacent to the mortise sections 18 and 20 as to secure the members 1 and 2 from being disengaged by a force acting in a direction normal to the structural member 1.

In accordance with the invention, locking means is provided having a portion thereof insertable into the vacant ingress section 17 so as to secure and prevent disengagement of the members 1 and 2 by a force acting in a direction normal to the structural member 2. Reference is made to FIGS. 2, 4, 5, 6 and 7 in which the locking means or parts thereof, is shown. The locking means comprises a generally rectangularly shaped plate-like wedge member 40 having a generally square shaped portion 41 and an adjacent elongated portion 42. Portion 42 has an edge 43 thereof which is elevated relative to the adjacent edge 44 of portion 41, the raising of edge 43 being facilitated in the manufacture by slicing a substantial distance into member 40 and bending the portion 42 upwardly relative to the portion 41. This has the effect of causing the upper side 45 of portion 42 to be generally inclined relative to the under side 46 of portion 41 so that the member 40, as a whole, is a sort of a wedge which is capable of performing a wedging type function as will be described.

Wedge 40 has a centrally located hole 50 in the portion 41 thereof. A generally U-shaped fastener 51 made of spring steel has openings 52 and 53 on opposite sides thereof and wedge portion 41 fits into fastener 51 with the wedge hole 50 being in alignment with the fastener holes 52 and 53. The upper fastener opening 52 is adapted or formed for threaded engagement with a machine screw.

The lower wall 27 of structural member 2 has a hole 54 adjacent the joint with this hole being disposed somewhat closer to the wall 26 than to the wall 28. A machine screw 55 is provided which extends through wall hole 54, through fastener opening 53, through wedge opening 50, and through and into threaded engagement with the fastener opening 52. Wall hole 54 is a slightly larger diameter than the head of screw 55 so that the screw head may be disposed within the lateral confines of the hole 54 or spaced therefrom as illustrated. Screw 55 is of a length as indicated in FIG. 2 so as to extend across structural member 2 and abut the inside of wall 25.

When the structural members 1 and 2 are joined as mentioned above, with the neck portions of the tenons 30 and 31 being disposed in the mortise sections 20 and 16, the clockwise turning of screw 55 will cause the wedge portion 42 to enter the ingress section 17 of opening 18. Wedge portion 42 becomes tightly wedged in the ingress section 17 as a result of turning screw 55 by reason of the upper side 45 thereof wedgingly engaging the upper edge 15 of the ingress section 17 and the lower side 46 of wedge portion 41 being forced to bear downwardly against the lower side of the fastener 51 which in turn is forced against the inside of wall 27 of structural member 2.

The clockwise turning of screw 55 has the effect of drawing the wedge member 40 downwardly into effective abutting engagement with the inside of wall 27. After such abutting engagement has occurred so that the downward movement of the wedge member 40 stops, the wedge member turns in a clockwise direction about the axis of screw 55 and wedge portion 42 is thereby caused to enter the ingress section 17. The continued turning of the screw 55 then causes the wedging action described above.

A screw drive is thus the only tool needed for assembling and disassembling a structure comprising elongated structural members, such as the structural members 1 and 2, having their end portions designed or equipped as disclosed herein to form right angle joints as described.

It should be understood, of course, that the foregoing relates to only a preferred embodiment of the invention and that numerous modifications or alterations may be made therein without departing from the spirit and scope of the invention as set forth in the appended claims.

What is claimed is:

1. An interlocking right angle joint for two structural members, the first one of said members having a flat wall slab with an opening comprising elongated ingress and mortise sections, said mortise section being of less length than said ingress section and in symmetrical relation thereto, said wall slab having a second mortise section defined therein in spaced relation to said first mortise section, the second one of said members having two spaced apart tenons engageable respectively with said mortise section to secure said second member in a direction normal to said first member, locking means insertable into said ingress section for securing said member in a direction normal to said second member, said locking means being pivotally mounted in said second structural member and being pivotally movable into and out of said ingress section of said opening.

2. Locking means according to claim 1 wherein at least one of said tenons has neck and shoulder portions adapted to fit in said mortise section of said opening, said locking means having a portion thereof movable into said ingress section of said opening to exert a progressively increasing wedging force between said first structural member and said tenon in said opening.

3. Locking means according to claim 2 wherein said locking means portion is inclined relative to said ingress section of said opening.

4. Locking means according to claim 3 wherein said second structural member comprises spaced apart walls, said locking means being pivotally mounted relative to one of said walls.

5. Locking means according to claim 4 wherein said locking means comprises a plate-like member having diverging surfaces with one of said diverging surfaces being engageable with one of said walls of said second structural member and the other of said diverging surfaces being wedgingly engageable with said first structural member through said ingress opening.

6. Locking means according to claim 5 wherein said locking means comprises thread means associated therewith, a screw engageable with said thread means, a hole in one of said walls of said structural members, said screw extending through said hole and transversely between said spaced apart walls of said second structural member, said screw being turnable to move said locking means into and out of engagement with said ingress section of said opening.

7. Locking means according to claim 6 wherein a generally U-shaped spring steel fastener fits over said plate-like member, said plate-like member having a hole, said fastener having a hole on one side thereof, and screw thread engaging means on the other side thereof, said screw thread engaging means and said holes of said locking means being in alignment for receiving said screw.

References Cited

UNITED STATES PATENTS

| 1,930,856 | 10/1933 | Mioton. | |
| 2,869,902 | 1/1951 | Gleitsman. | |
| 2,999,570 | 9/1961 | Seiz | 287—189.36 |
| 3,047,108 | 7/1962 | D'Altrui | 287—189.36 |
| 3,358,848 | 12/1967 | Johnsson | 287—56 XR |

FOREIGN PATENTS

| 511,623 | 1920 | France. |
| 875,999 | 1953 | Germany. |

REINALDO P. MACHADO, Primary Examiner

A. V. KUNDRAT, Assistant Examiner

U.S. Cl. X.R.

287—189.36